US011593571B2

United States Patent
Liu et al.

(10) Patent No.: US 11,593,571 B2
(45) Date of Patent: Feb. 28, 2023

(54) MACHINE TRANSLATION METHOD, DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Lemao Liu, Shenzhen (CN); Xintong Li, Shenzhen (CN); Shuming Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 299 days.

(21) Appl. No.: 16/895,275

(22) Filed: Jun. 8, 2020

(65) Prior Publication Data
US 2020/0302127 A1 Sep. 24, 2020

Related U.S. Application Data

(63) Continuation of application No. PCT/CN2019/073858, filed on Jan. 30, 2019.

(30) Foreign Application Priority Data
Feb. 8, 2018 (CN) .......................... 201810131743.0

(51) Int. Cl.
G06F 40/58 (2020.01)
G06N 3/08 (2023.01)
(52) U.S. Cl.
CPC .............. *G06F 40/58* (2020.01); *G06N 3/08* (2013.01)
(58) Field of Classification Search
None
See application file for complete search history.

(56) References Cited

U.S. PATENT DOCUMENTS

2009/0055183 A1* 2/2009 Yakhnenko ........... G10L 15/142
704/256.5
2015/0205788 A1 7/2015 Kadotani et al.

FOREIGN PATENT DOCUMENTS

| CN | 105183720 A | 12/2015 |
| CN | 106782518 A | 5/2017 |
| CN | 107368476 A | 11/2017 |

OTHER PUBLICATIONS

The World Intellectual Property Organization (WIPO) International Search Report for PCT/CN2019/073858 dated May 7, 2019 5 Pages (including translation).

(Continued)

*Primary Examiner* — Quynh H Nguyen
(74) *Attorney, Agent, or Firm* — Anova Law Group, PLLC

(57) ABSTRACT

A machine translation method includes: receiving to-be-processed information expressed in a source language; encoding the to-be-processed information, and generating an expression vector sequence of the to-be-processed information; and predicting feature information of a target foresight word at a first moment by using a prediction model. The feature information includes at least one of a part of speech or a word category of the target foresight word. The method also includes: determining a context vector corresponding to the first moment in the expression vector sequence according to the feature information of the target foresight word; and decoding the context vector by using a decoder, to obtain target content that corresponds to the context vector and expressed in a target language.

17 Claims, 9 Drawing Sheets

(56) References Cited

OTHER PUBLICATIONS

Dzmitry Bahdanau et al., "Neural machine translation by jointly learning to align and translate," In Proceedings of ICLR. 2015. 15 pages.
Jan-Thorsten Peter et al., "Generating alignments using target foresight in attention-based neural machine translation," The Prague Bulletin of Mathematical Linguistics. No. 108, Jun. 2017, pp. 27-36. 10 pages.
Lemao Liu et al., "Neural machine translation with supervised attention," In Proceedings of COLING, 2016. 10 pages.

* cited by examiner

MACHINE TRANSLATION METHOD, DEVICE, AND COMPUTER-READABLE STORAGE MEDIUM

CROSS-REFERENCES TO RELATED APPLICATIONS

This application is a continuation application of PCT Patent Application No. PCT/CN2019/073858, filed on Jan. 30, 2019, which claims priority to Chinese Patent Application No. 201810131743.0, filed with the National Intellectual Property Administration, PRC on Feb. 8, 2018 and entitled "MACHINE TRANSLATION METHOD, DEVICE, AND COMPUTER-READABLE STORAGE MEDIUM", both which are incorporated herein by reference in their entirety.

FIELD OF THE TECHNOLOGY

The present disclosure relates to the field of computers, and in particular, to a machine translation technology.

BACKGROUND OF THE DISCLOSURE

Machine translation (MT) refers to a process of converting text or speech in a source language into content with the same meaning in a target language by using a machine. With rising of deep learning techniques, recently a deep neural network technology is also applied to the MT, and neural machine translation (NMT) has become a new generation translation technology.

Currently, in NMT, an encoder-decoder framework is used in understanding semantics and language translation. The encoder is configured to perform encoding on an input end, and the decoder performs decoding on an output end. For example, given an inputted source language sentence, the sentence is encoded into an expression vector of the input end by using the encoder first. Then, in a decoding stage, a new target word is generated by using the decoder according to the expression vector of a source end and a context vector of the source end at a current moment.

Although the source language sentence is known, because words in the target language are incrementally generated, at the current moment, the target word is unknown, and the target word needs to be obtained through decoding by using the decoder before a next time. Consequently, when aligning words in the source language with the target language by using the decoder, a problem of a repeated translation or mistranslation is likely to occur, leading to a decrease in translation accuracy.

SUMMARY

Embodiments of the present disclosure provide a machine translation method, a device, and a computer-readable storage medium, for improving translation accuracy.

According to a first aspect, an embodiment of the present disclosure provides a machine translation method, applied to a translation device, and including: receiving to-be-processed information expressed in a source language; encoding the to-be-processed information, and generating an expression vector sequence of the to-be-processed information; and predicting feature information of a target foresight word at a first moment by using a prediction model. The feature information includes at least one of a part of speech or a word category of the target foresight word. The method also includes: determining a context vector corresponding to the first moment in the expression vector sequence according to the feature information of the target foresight word; and decoding the context vector by using a decoder, to obtain target content that corresponds to the context vector and expressed in a target language.

According to a second aspect, an embodiment of the present disclosure provides a translation device, including: a memory, configured to store computer-executable program code; a network interface; and a processor, coupled to the memory and the network interface. The processor is configured to: receive to-be-processed information expressed in a source language; encode the to-be-processed information, and generate an expression vector sequence of the to-be-processed information; and predict feature information of a target foresight word at a first moment by using a prediction model. The feature information includes at least one of a part of speech or a word category of the target foresight word. The processor is also configured to: determine a context vector corresponding to the first moment in the expression vector sequence according to the feature information of the target foresight word; and decode the context vector by using a decoder, to obtain target content that corresponds to the context vector and expressed in a target language.

According to a third aspect, an embodiment of the present disclosure provides a non-transitory computer storage medium, configured to store a computer software instruction used by a translation device. The computer software instruction including a program that, when being executed by the translation device, cause the translation device to perform: receiving to-be-processed information expressed in a source language; encoding the to-be-processed information, and generating an expression vector sequence of the to-be-processed information; and predicting feature information of a target foresight word at a first moment by using a prediction model. The feature information includes at least one of a part of speech or a word category of the target foresight word. The computer program also causes the translation device to perform: determining a context vector corresponding to the first moment in the expression vector sequence according to the feature information of the target foresight word; and decoding the context vector by using a decoder, to obtain target content that corresponds to the context vector and expressed in a target language.

DESCRIPTION OF EMBODIMENTS

Embodiments of the present disclosure provide a machine translation method and a device, for improving translation accuracy.

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

In the specification, claims, and accompanying drawings of the present disclosure, the terms "first", "second", "third", "fourth", and so on (if existing) are intended to distinguish between similar objects rather than describe a specific order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those units, but may include other units not expressly listed or inherent to such a process, method, system, product, or device.

Figure 1:
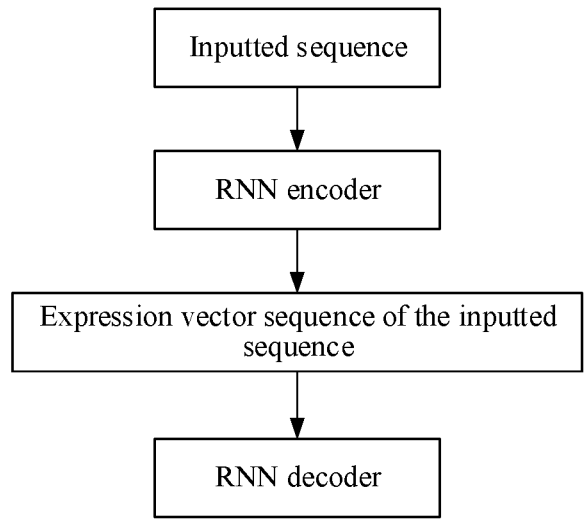
FIG. 1 is a schematic diagram of an encoder-decoder architecture of MT according to an embodiment of this application.

The embodiments of the present disclosure are mainly applied to an encoder-decoder architecture. FIG. 1 is a schematic diagram of an encoder-decoder architecture of MT according to an embodiment of this application. The so-called encoding is a process of converting an inputted sequence on a source end into one corresponding expression vector sequence. The so-called decoding is a process of further converting the expression vector sequence generated by the encoder into an outputted sequence, and outputs the outputted sequence on a target end. In a translation scenario, the inputted sequence is to-be-translated information, and the outputted sequence is translated information.

In the embodiments of this application, the to-be-translated information may be text information, or may be speech information. Using an example in which the to-be-translated information is the text information, inputted information may be one inputted sentence, and the inputted sentence is "法国失业人数再度回升" expressed in Chinese. Through the architecture in FIG. 1, the inputted sentence is translated into English, that is, "French unemployment rises again". Chinese is a source language, and English is a target language.

It may be understood that, in a specific implementation, neither of neural network structures of the encoder and the decoder is fixed. Optionally, there are a convolutional neural network (CNN), a recurrent neural network (RNN), a gated recurrent unit (GRU), a long short term memory (LSTM), a bidirectional recurrent neural network (BiRNN), and the like. Alternatively, different neural networks may be used during the encoding and the decoding. For example, the BiRNN is used during the encoding, and the RNN is used during the decoding, or the RNN is used during the encoding, and the LSTM is used during the decoding. Specifically, the neural network is not limited in an actual application. For ease of description, the RNN is used as both the encoder and the decoder in some embodiments.

For ease of understanding, terms included in the present disclosure are first described:

Attention model: a probability model used for selecting a context vector. Such a model generates an "attention range" when generating outputs. The "attention range" can indicate a portion in an inputted sequence that needs to be focused during subsequent outputting. Then, a next output is generated according to a focused region. This process is repeated. In the embodiments of this application, the decoder includes the attention model.

Figure 2:
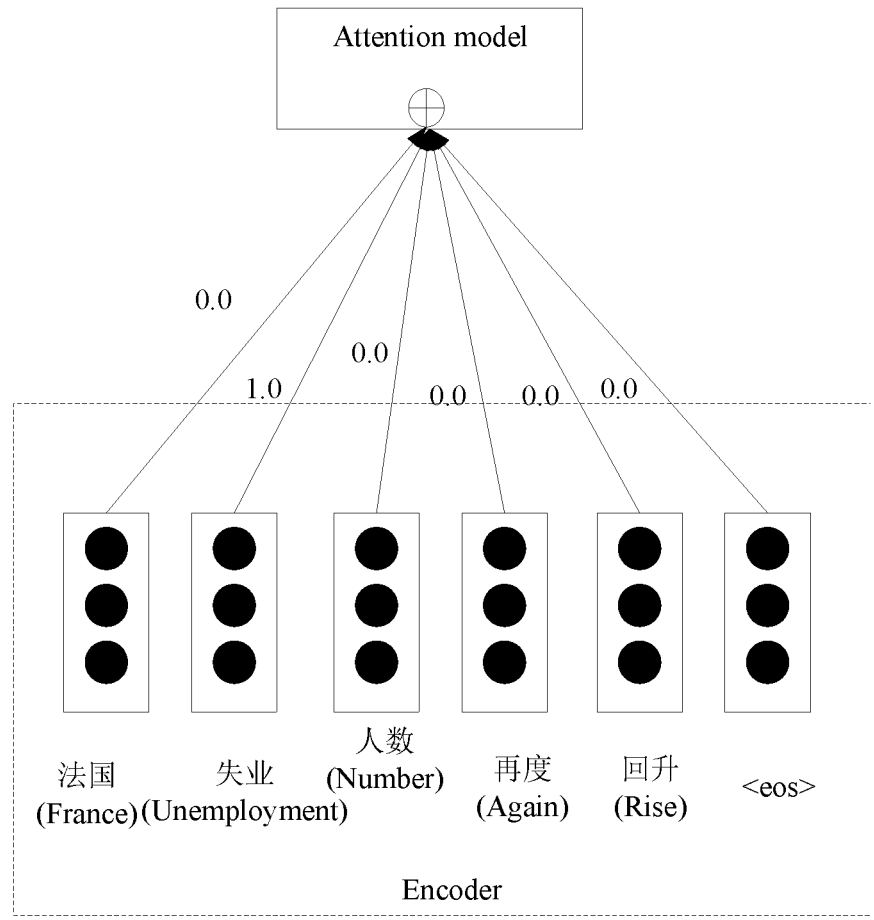
FIG. 2 is a schematic diagram of selecting, by an attention model, a context vector according to an embodiment of this application.

Context vector: understood with reference to FIG. 2. FIG. 2 is a schematic diagram of selecting, by an attention model, a context vector. The context vector is used for indicating source end content that is translated at a current moment. The attention model reads the expression vector sequence outputted by the encoder, and outputs one alignment probability for each expression vector in the expression vector sequence. Each expression vector (a vertical black-dotted bar in FIG. 2) corresponds to one source end word. A higher alignment probability represents a higher correlation with the source end content translated at the current moment. A vector corresponding to the highest probability is a context vector at the current moment. In FIG. 2, an inputted sentence is "法国失业人数再度回升" ("<eos>" is a terminator of a sentence). A probability corresponding to "法国" (France) is 0, a probability corresponding to "失业" (unemployment) is 1, and probabilities corresponding to "人数" (number/rate), "再度" (again), and "回升" (rise) are all 0. The probability corresponding to "失业" is the highest, so that an expression vector of "失业" is the context vector at the current moment.

Target foresight (TF) word: a to-be-translated word at the current moment during a translation process, that is, a next word of a target word that is being translated at the current moment. For example, if a word that has just been translated at the current moment (the $i^{th}$ moment) is "French", the target foresight word is "unemployment". However, "unemployment" is unknown at the current moment, and is translated before the $(i+1)^{th}$ moment.

The first moment in the embodiments of the present disclosure is the current moment. For example, the current moment is represented by i, and the second moment is an adjacent moment before the current moment, and is represented by (i−1).

Figure 3:
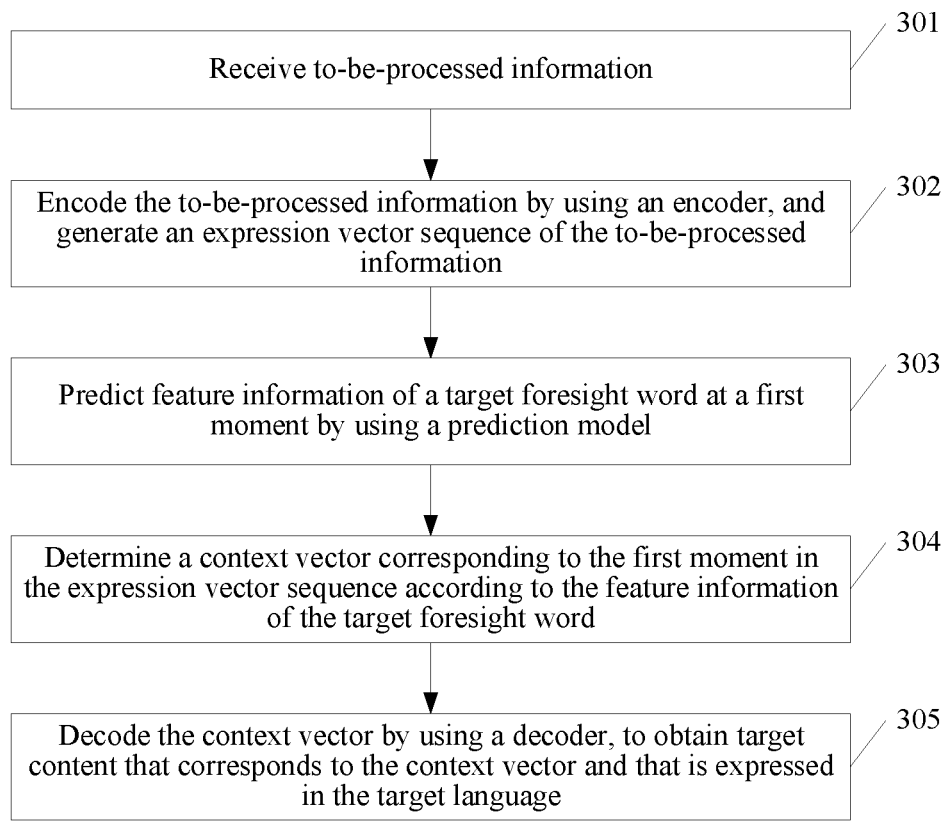
FIG. 3 is a schematic flowchart of steps of an embodiment of a machine translation method according to an embodiment of this application.
Figure 4:
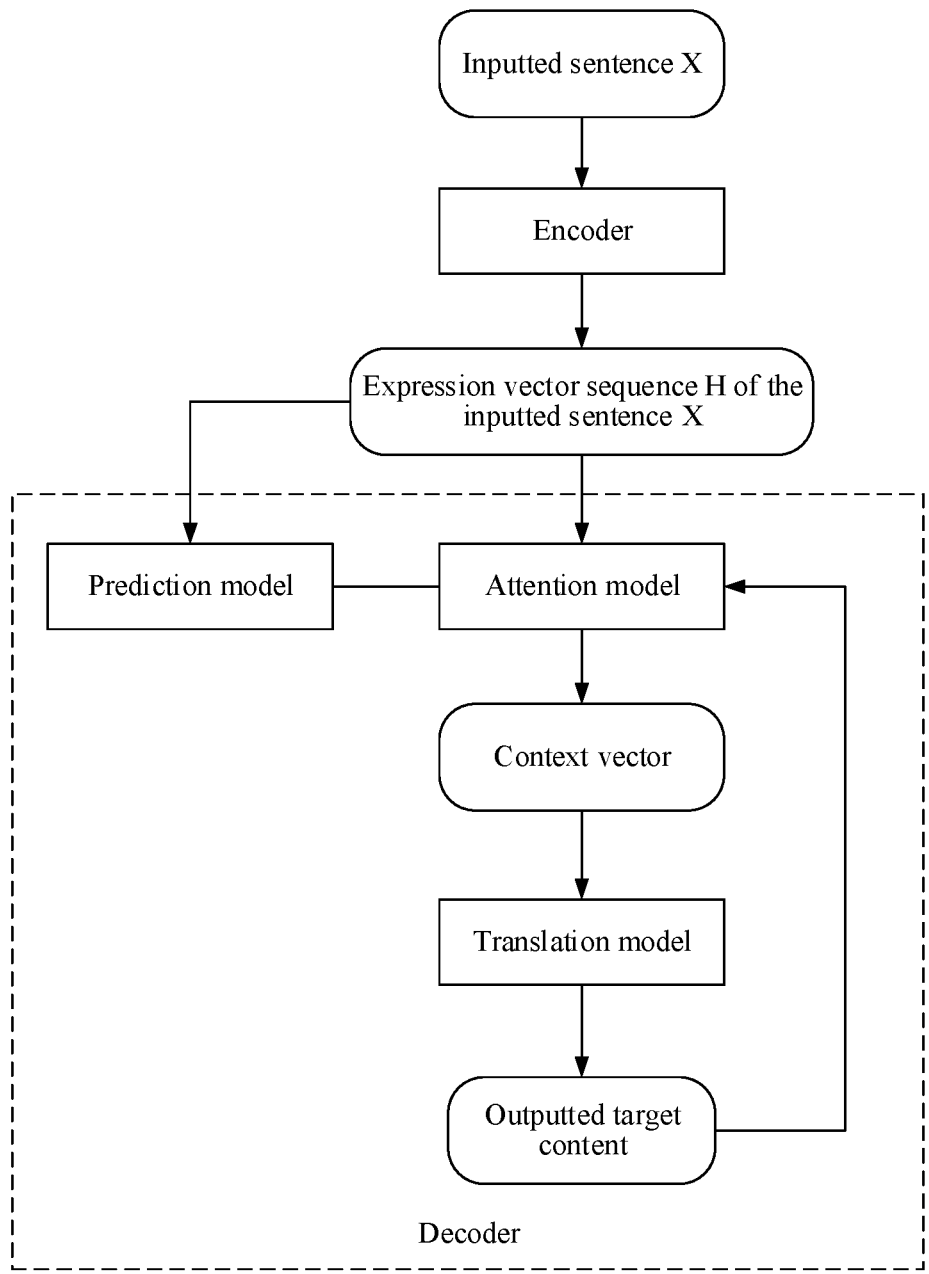
FIG. 4 is a schematic flowchart of MT according to an embodiment of this application.

FIG. 3 is a schematic flowchart of steps of an embodiment of a machine translation method according to this application. FIG. 4 is a schematic flowchart of MT according to an embodiment of this application.

The embodiments of the present disclosure provide an embodiment of a machine translation method, including the following.

In some embodiments of this application, assuming that an inputted sequence on a source end is $x=\langle x_1, x_2, \ldots, x_{|x|}\rangle$, where a length of the inputted sequence is $|x|$, and an outputted sequence on a target end is $y=\langle y_1, y_2, \ldots y_{|y|}\rangle$. This system is modeled based on a probability model of an encoder-decoder framework. A machine translation method in some embodiments of the present disclosure is applied to a translation device. The following describes some embodiments in detail from the perspective of a translation device side.

Step 301. Receive to-be-processed information, the to-be-processed information being expressed in a source language.

The translation device receives to-be-processed information. The to-be-processed information may be text information, or may be speech information. In some embodiments of this application, an example in which the to-be-processed information is the text information is used for description. The to-be-processed information is an inputted sentence X. A sequence corresponding to the inputted sentence is $x=\langle x_1, x_2, \ldots, x_{|x|}\rangle$, and $|x|$ is used for representing a length of the sentence.

In an application scenario, the inputted sentence X is "法国失业人数再度回升". Correspondingly, $x_1$ corresponds to "法国", $x_2$ corresponds to "失业", $x_3$ corresponds to "人数", $x_4$ corresponds to "再度", and $x_5$ corresponds to "回升". The to-be-processed information is expressed in the source language. An example in which the source language is Chinese is used for description. However, in an actual application, the source language may be any language. The source language is not limited herein. For example, the source language may be English, French, German, or the like.

Step 302. Encode the to-be-processed information by using an encoder, and generate an expression vector sequence of the to-be-processed information.

The encoder may be an RNN, that is, the RNN is used for modeling a context of the source end. The encoder processes the inputted sentence, and generates an expression vector sequence H corresponding to the inputted sentence X.

Step 303. Predict feature information of a target foresight word at a first moment by using a prediction model, the target foresight word being expressed in a target language, and the first moment being the current moment.

The prediction model is used for predicting feature information of a target foresight word. The feature information includes, but is not limited to, a part of speech or a word category. For example, the part of speech includes, but is not limited to, verb, noun, pronoun, preposition, and the like. The word category includes, but is not limited to, an object class, a character class, an animal class, and the like. The word category in some embodiments of the present disclosure the present disclosure may be classified according to a specific classification criterion in a system in an actual application. Specifically, the classification is not limited in the actual application.

The following uses an example in which the feature information in some embodiments is the part of speech for description.

It is assumed that $u_i$ represents a part-of-speech tag of a target foresight word at the $i^{th}$ moment (represented by $y_i$). In some embodiments, by using a result obtained by the prediction model predicting the part-of-speech tag of the target foresight word $y_i$, the prediction model may be marked as the following model 1 as follows:

$$\beta_i = P(u_i|y_{i-1},x)$$

The following describes three manners in which a prediction result of a part of speech of a target foresight word may be obtained.

In a first implementation, the feature information of the target foresight word at the first moment is predicted by using the prediction model according to a hidden state of the decoder at a second moment. The second moment is an adjacent moment before the first moment.

Figure 5:
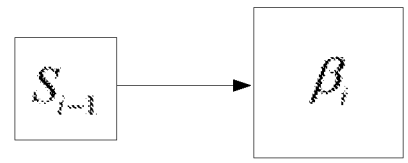
FIG. 5 is a schematic structural diagram of a network in an example of a prediction model according to an embodiment of this application.

FIG. 5 is a schematic structural diagram of a network in an example of a prediction model. FIG. 5 shows a simple prediction model. The prediction model depends on a hidden state $S_{i-1}$ of the decoder RNN. A hidden state of the decoder at the $)^{th}$ moment is inputted into the prediction model, and the prediction model determines the part of speech of the target foresight word at the $i^{th}$ moment according to the hidden state of the decoder at the $(i-1)^{th}$ moment. That is, correspondingly, a model 2 is obtained by formalizing the model 1 as follows:

$$\beta_i = P(u_i|y<i,x) = \text{softmax}(\psi(y_{u-1},S_{i-1}))$$

where $\psi$ represents a feed-forward neural network, and soft max( ) represents a normalization operation. An inputted value of the neural network usually may be positive or negative. Therefore, an index value that usually uses the inputted value first is converted into a positive value, and then all index values are normalized, to obtain a probability distribution. $S_{i-1}$ represents a hidden state of the decoder at the $(i-1)^{th}$ moment, and $y_{i-1}$ represents a corresponding sequence outputted on the target end at the $(i-1)^{th}$ moment. The prediction model $\beta_i$ reads the hidden state $S_{i-1}$ of the decoder at the $(i-1)^{th}$ moment, and obtains the part of speech of the target foresight word at the $i^{th}$ moment according to the hidden state $S_{i-1}$.

$\psi$ in this example may be alternatively another neural network, and the feed-forward neural network in this example is only used for illustrative description.

In this example, the prediction model predicts the part of speech of the target foresight word by depending on the hidden state $S_{i-1}$ of the decoder RNN. A network structure is simple, and a calculation amount is relatively small.

In a second implementation, a first result is obtained by using another extra neural network model according to target content corresponding to a second moment (the $(i-1)^{th}$ moment). The second moment is an adjacent moment before the first moment. The first result is a hidden state of a hidden unit of the neural network model at the first moment. Then, the feature information of the target foresight word at the first moment is predicted by using the prediction model according to the first result.

Figure 6:
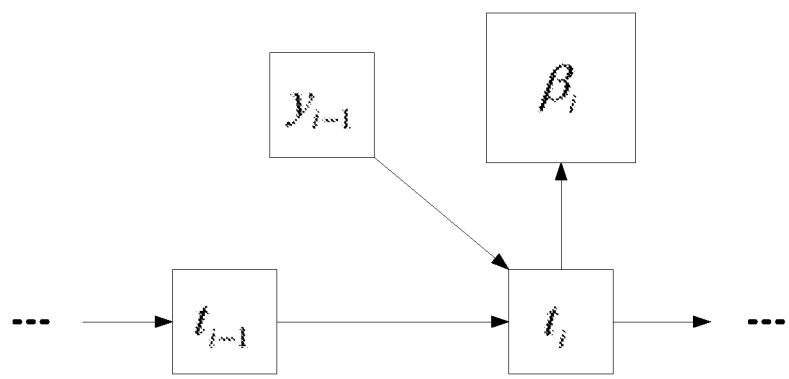
FIG. 6 is a schematic structural diagram of a network in another example of a prediction model according to an embodiment of this application.

FIG. 6 is a schematic structural diagram of a network in another example of a prediction model.

Different from the first implementation, in the second implementation, an extra RNN is designed to assist prediction of the part of speech $u_i$ of the target foresight word. It is assumed that a hidden unit of the extra RNN is t. In this example, the extra RNN is referred to as a "target RNN". The target RNN may be a GRU-based neural network. At the $i^{th}$ moment, a hidden state of the hidden unit is $t_i$, and a model 3 is obtained by formalizing the model 1 as follows:

$$\beta_i = P(u_i|y<i,x) = \text{softmax}(\psi(y_{i-1},t_i))$$

where $\psi$ represents a feed-forward neural network, and soft max( ) represents a normalization operation. In this example, $t_i$ represents the hidden state of the hidden unit of the target RNN at the $i^{th}$ moment. $t_i = g(t_{i-1}, y_{i-1})$ where $g( )$ represents the GRU-based neural network, and $y_{i-1}$ represents target content outputted on the target end at the $(i-1)^{th}$ moment. For example, the target content outputted on the target end at the $(i-1)^{th}$ moment is "unemployment".

In this example, at the $i^{th}$ moment, the hidden unit reads the target content y outputted on the target end at the $(i-1)^{th}$ moment and a hidden state $t_{i-1}$ of the hidden unit at the $(i-1)^{th}$ moment. The hidden unit t outputs the hidden state $t_i$ at the $i^{th}$ moment, and the prediction model predicts the part of speech of the target foresight word according to $t_i$. In this example, for prediction of the part of speech of the target foresight word at the $i^{th}$ moment, target content outputted on the target end at a previous moment (the $(i-1)^{th}$ moment) is considered, so that a prediction result is relatively accurate.

In a third implementation, the first result is obtained by using the extra neural network model (the target RNN) according to the target content corresponding to the second moment and a word vector at the first moment. The word vector is a vector for performing expression according to a phrase order in the expression vector sequence. The first result is a hidden state of a hidden unit of the neural network model at the first moment. The feature information of the target foresight word at the first moment is predicted by using the prediction model according to the first result.

The word vector is described by using an example. For example, the inputted sentence X is "法国 失业 人数 再度 回升", and each word corresponds to one expression vector $c^t$. According to a phrase order, a word vector corresponding to the $(i-2)^{th}$ moment is a phrase vector $c_{i-2}'$ corresponding to "法国", a word vector corresponding to the $(i-1)^{th}$ moment is a phrase vector $c_{i-1}'$ corresponding to "失业", and a word vector corresponding to the $i^{th}$ moment is a phrase vector $c_i'$ corresponding to "人数".

Figure 7:
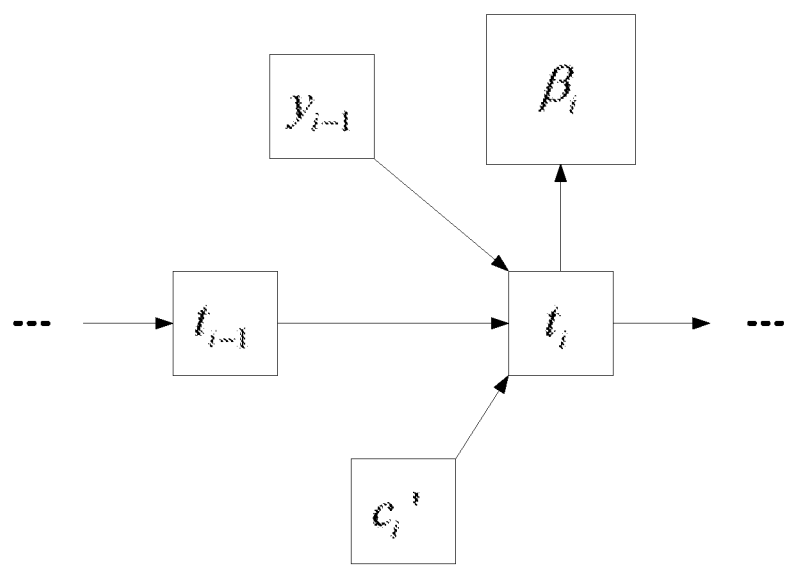
FIG. 7 is a schematic structural diagram of a network in another example of a prediction model according to an embodiment of this application.

FIG. 7 is a schematic structural diagram of a network in another example of a prediction model.

In the third implementation, not only information of a target word outputted on the target end is considered, but also a phrase vector inputted on the source end is considered. A model 4 is obtained by formalizing the model 1 as follows:

$$\beta_i = P(u_i|y<i, x) = \text{softmax}(\psi(y_{i-1}, t_i, c_i'))$$

where $\psi$ represents a feed-forward neural network, and soft max( ) represents a normalization operation. $y_{i-1}$ represents target content outputted on the target end at the $(i-1)^{th}$ moment, and $t_i$ represents a hidden state of the hidden unit at the $i^{th}$ moment. $t_i = g(y_{i-1}, t_{i-1}, c_i')$, where g( ) represents the GRU-based neural network. In this example, at the $i^{th}$ moment, the hidden unit reads the target content $y_{i-1}$ outputted on the target end at the $(i-1)^{th}$ moment, a hidden state $t_{i-1}$ of the hidden unit at the $(i-1)^{th}$ moment, and a phrase vector $c_i'$, to obtain a hidden state of the hidden unit at the first moment. The prediction model predicts the part of speech of the target foresight word at the $i^{th}$ moment according to $t_i$.

In this example, for prediction of the part of speech of target foresight word at the $i^{th}$ moment, target content outputted on the target end at a previous moment and phrase vectors in the expression vector sequence on the source end are considered, so that a prediction result of the feature information of the target foresight word is more accurate.

Step 304. Determine a context vector corresponding to the first moment in the expression vector sequence according to the feature information of the target foresight word.

It is assumed that $P(u_i|Y<i, x)$ is a prediction result of the prediction model.

In the first implementation, feature information of a target foresight word is obtained, and the feature information of the target foresight word is estimated, to obtain an estimation result. Further, a context vector corresponding to the first moment in the expression vector sequence is determined according to the estimation result.

An estimation result of the prediction result is merged as an input into an attention model. The estimation result may be a result of maximum a posterior estimation (MAP), and the estimation result is merged as an input into the attention model:

$$e_{ij} = a(S_{i-1}, h_j, z_i)$$

where a( ) represents the attention model, $S_{i-1}$ represents a hidden state at the $(i-1)^{th}$ moment, $h_j$ is a vector at the $(j)^{th}$ moment in the expression vector sequence, and $z_i$ represents a vector corresponding to the result of the MAP. A definition of $z_i$ is as follows:

$$z_i = Z(\arg\max_{u_i} P(u_i | y < i, x))$$

A context vector $c_i$ corresponding to the first moment in the expression vector sequence H is determined by using the attention model.

In the second implementation, feature information of a target foresight word is obtained, and then an expected value of the feature information of the target foresight word is determined. Further, a context vector corresponding to the first moment in the expression vector sequence is determined according to the expected value.

An expected value of the prediction result is inputted into the attention model. $z_i$ is defined as follows:

$$z_i = \sum_{u_i} Z(u_i) P(u_i | y < i, x)$$

In some scenarios, accuracy in the second implementation in this example is higher than that in the first implementation. In the first implementation, determining whether the context vector is accurate depends on prediction accuracy of $P(u_i|y<i, x)$. For example, it is assumed that at the $i^{th}$ moment, a correct part-of-speech tag of the target foresight word is noun (represented by "NN"). However, a calculated probability of a word whose part of speech is NN is $P(u_i=NN|y<1, x)=0.4$. With regard to $P(u_i=VV|y<i, x)=0.41$, if a policy of the MAP is used, "VV" is selected as the part of speech of the target foresight word, and in addition, a contribution of the correct part of speech "NN" is totally neglected. Therefore, the attention model may receive a piece of wrong information, and affects an effect of alignment with the source language. By using the second implementation in this example, an expected value of the prediction result is inputted into the attention model, that is, an average value of parts of speech of target foresight words that are obtained through prediction is inputted into the attention model, thereby improving accuracy of the parts of speech of the target foresight words.

In some embodiments, after predicting the part-of-speech prediction result of the target foresight word, the disclosed method/device does not directly input the prediction result of the maximum a posteriori into the attention model, but inputs the predicted expected result (e.g., expected value) into the attention model. The noise problem caused by the target foresight part-of-speech prediction error in the attention model. Furthermore, since the target sentence is known during training, its part-of-speech tag is also known. The disclosed method/device may use a joint method to train the prediction model and translation model of target foresight part-of-speech tagging/prediction.

Figure 8:
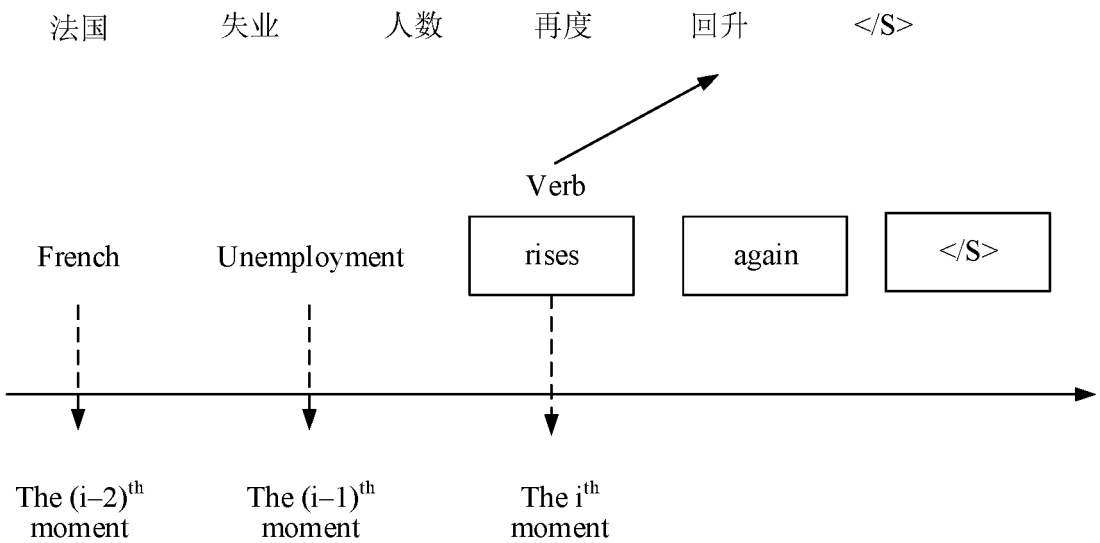
FIG. 8 is a schematic diagram of a scenario according to an embodiment of this application.

The attention model further determines a current context vector C, in the expression vector sequence H at the current moment according to the part of speech of the target foresight word. FIG. 8 is a schematic diagram of a scenario according to an embodiment of this application.

At the $(i-1)^{th}$ moment, the target content outputted on the target end is "unemployment", and the prediction model predicts that a part of speech of a current target foresight word is verb, that is, a next target word of "unemployment". Target words in the blocks are words that have not been translated (such as rise and again). The attention model aligns source language words with target language words according to the part of speech of the target foresight word. A solid-line arrow in FIG. 8 represents alignment. In the expression vector sequence, "回升" is a verb. Probabilities of expression vectors at the moment that are obtained by the attention model are as follows: a probability corresponding to "法国" is 0, a probability corresponding to "失业" is 0, a probability corresponding to "人数" is 0, a probability corresponding to "再度" is 0, and a probability corresponding to "回升" is 1. Therefore, an expression vector of "回升" is the context vector at the current moment.

Compared with the existing technology, in some embodiments, the context vector at the current moment determined by the attention model according to the part of speech of the target foresight word is more accurate. For example, an example in FIG. 8 is used for description. At the $(i-1)^{th}$ moment, the target content outputted on the target end is "unemployment", and in the existing technology, the attention model aligns "unemployment" with "人数" in the source language. However, in English, the meaning of unemployment is a quantity of unemployed people. In the existing technology, if it is determined that the context vector corresponding to the current moment is a vector of "人数", the source language is repeatedly translated at the $i^{th}$ moment. However, in some embodiments, the attention model may further determine the context vector in the expression vector sequence on the source end according to the part of speech of the target foresight word, thereby improving accuracy of determining the context vector.

Step 305. Decode the context vector by using a decoder, to obtain target content that corresponds to the context vector and that is expressed in the target language.

The decoder includes a translation model. The context vector at the current moment is translated into corresponding target content in the target language by using the translation model, that is, the context vector at the current moment is an expression vector corresponding to "回升". The translation model translates "回升" in Chinese into "rises". The word "rises" is the corresponding target content in the target language.

Step 303 to step 305 are repeated until the inputted sentence is translated into a corresponding sentence in the target language, that is, the inputted sentence "法国 失业 人数 再度 回升" is translated into "French unemployment rises again </S>", where </S> is a terminator. Therefore, target information corresponding to the to-be-processed information is obtained, and the target information is a translated corresponding sentence in the target language.

Figure 9:
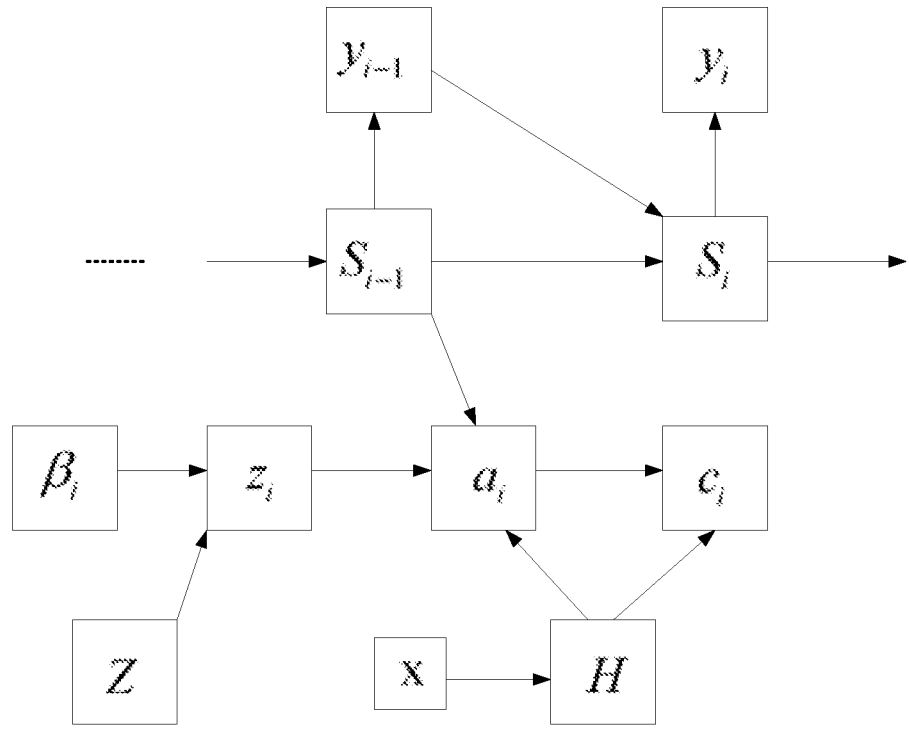
FIG. 9 is a schematic structural diagram of a network of MT according to an embodiment of this application.

FIG. 9 is a schematic structural diagram of a network of MT according to an embodiment of this application. The method in the embodiments of the present disclosure the present disclosure is applied to a translation device. The device receives to-be-processed information X, the to-be-processed information being expressed in a source language (such as Chinese); encodes the to-be-processed information by using an encoder, and generates an expression vector sequence H of the to-be-processed information; predicts feature information of a target foresight word at a first moment by using a prediction model $\beta_i$, and inputs an expected value $z_i$ of a prediction result $u_i$ of the feature information, a matrix Z of the prediction result, and a hidden state $S_{i-1}$ of a decoder at the $(i-1)^{th}$ moment into an attention model $a_i$, where the attention model determines a context vector $c_i$ at the $i^{th}$ moment in the expression vector sequence H; inputs the context vector $c_i$ at the $i^{th}$ moment, target content $y_{i-1}$ outputted by a target end at the $(i-1)^{th}$ moment, and the hidden state $S_{i-1}$ of the decoder at the $(i-1)^{th}$ moment into a hidden unit of the decoder, to obtain a hidden state $S_i$ of the decoder at the $i^{th}$ moment; and obtains, according to $S_i$, target content outputted on the target end at the $i^{th}$ moment.

In some embodiments, before the attention model is modeled, a prediction model is designed for predicting feature information (such as a part of speech) of a target foresight word, and then the feature information of the target foresight word is inputted into the attention model. The prediction model predicts the part of speech of the target foresight word rather than target content of the word. In this way, complexity of the model can be greatly reduced. The attention model determines a context vector according to the feature information of the target foresight word, that is, aligns a context vector in the expression vector sequence with a target word in the target information, thereby improving accuracy of determining the context vector. Based on the foregoing embodiments, methods for training the prediction model and determining a parameter of the prediction model are briefly described.

Training the prediction model: a triplet set $\{\langle x^k, y^k, u^k\rangle | k=1, \ldots K\}$ is given. $x^k$ is an inputted source language sentence, $y^k$ is a target language sentence, and $u^k$ is a sequence of feature information (such as a part of speech) of $y^k$, where k is used for indicating a quantity of triplets. The prediction model is trained according to information in the triplet set.

In some embodiments, a parameter of the prediction model is calculated by using an estimation method, for example, the estimation method may be maximum likelihood estimation, that is, the following target function l needs to be minimized:

$$l = -\sum_k \sum_i (\log P(y_i^k | y^k < i, x^k) + \lambda \log P(u_i^k | y^k < i, x^k))$$

where $P(y_i^k|y_k<i, x^k)$ is a translation model, $P(u_i^k|y^k<i, x^k)$ is the prediction model, $y_i^k$ is a phrase corresponding to the $i^{th}$ moment in the target language sentence, and $u_i^k$ is feature information of $y_i^k$. In some embodiments, the parameter of the model may be determined by using a mini-batch stochastic gradient ascent method.

In a reasoning process of the model, in some embodiments, for $z_i$ in step 304, there are two implementations. Both the two methods for merging $z_i$ into the attention model may depend on a pruning beam search algorithm.

In a first implementation, $z_i$ is a vector corresponding to a result of MAP. In this implementation, two beams are used, one of the beams is used for storing a candidate word, and the other beam is used for storing a candidate part of speech.

Then, a score of the model is calculated according to a formula of the foregoing target function.

In a second implementation, that is, $z_i$ is an expected value of a prediction result, a regular manner is used. A score of the model may be calculated only according to the translation model, that is, λ=0, and the parameter of the model is solved according to the foregoing target function.

Some embodiments is described with reference to an application scenario below. Referring to FIG. 4 and FIG. 8, an inputted sentence X is received, and the inputted sentence X is "法国 失业 人数 再度 回升". An RNN encoder encodes the inputted sentence X, to obtain an expression vector sequence H of X. At the $0^{th}$ moment, a prediction model predicts a part of speech of a target foresight word at the $0^{th}$ moment, and the part of speech of the target foresight word at the $0^{th}$ moment that is predicted by the prediction model is noun. An attention model receives that the part of speech of the target foresight word at the $0^{th}$ moment is noun. The attention model obtains alignment probabilities of expression vectors of words: a probability corresponding to "法 国" is 1, a probability corresponding to "再度" is 0, a probability corresponding to "人数" is 0, a probability corresponding to "再度" is 0, and a probability corresponding to "回升" is 0. The attention model determines that a context vector at the $0^{th}$ moment is an expression vector corresponding to "法国". "法国" is translated by using the translation model, and "法国" is translated into "French". At the first moment, the prediction model predicts that a part of speech of a target foresight word at the first moment is noun, and the attention model obtains alignment probabilities of expression vectors of words: a probability corresponding to "法国" is 0, a probability corresponding to "失业" is 1, a probability corresponding to "人数" is 0, a probability corresponding to "再度" is 0, and a probability corresponding to "回升" is 0. The attention model determines that a context vector at the first moment is an expression vector corresponding to "失业". "失业" is translated by using the translation model, and "失业" is translated into "unemployment". At the second moment, the prediction model predicts that a part of speech of a target foresight word at the second moment is verb, and the attention model obtains alignment probabilities of expression vectors of words: a probability corresponding to "法国" is 0, a probability corresponding to "失业" is 0, a probability corresponding to "人数" is 0, a probability corresponding to "再度" is 0, and a probability corresponding to "回升" is 1. The attention model determines that a context vector at the second moment is an expression vector corresponding to "回升". "回升" is translated by using the translation model, and "回升" is translated into "rises". This process is repeated until a terminator is generated. The entire inputted sentence X is translated into "French unemployment rises again </S>".

In some embodiments, a part of speech of a target foresight word is predicted by using a prediction model, to increase sufficiency of modeling of an attention model, thereby improving accuracy of alignment of the attention model in the translation process, avoiding a case of a repeated translation in the translation process, and improving translation accuracy.

An effect of applying the technical solutions in the embodiments of the present disclosure the present disclosure to a translation scenario is tested. For example, in a Chinese-to-English translation task and a Japanese-to-English translation task, it shows that the method provided in the embodiments of the present disclosure can produce a better effect than the existing technology (such as a baseline system). Specifically, for word alignment between Chinese and English, an alignment error rate (AER) is reduced by 7%. In addition, in terms of a Chinese-to-English translation and a Japanese-to-English translation, using an assessment indicator BLEU as an example, in the BLEU indicator of the method in the embodiments of the present disclosure is improved by 1.9% compared with that of the baseline system in the existing system. In the method provided in the embodiments of this application, performance in both alignment and translation is improved, improving accuracy of an overall translation.

According to the foregoing technical solutions, it can be learned that the embodiments of the present disclosure have the following advantages: to-be-processed information is received, the to-be-processed information being expressed in a source language. The to-be-processed information is processed by using an encoder, and an expression vector sequence of the to-be-processed information is generated. Feature information of a target foresight word at a first moment is predicted by using a prediction model, the target foresight word being expressed in a target language. The feature information predicted by the prediction model may be specifically a part of speech or a word category of the target foresight word instead of target content of a target word. Because prediction difficulty of the part of speech or the word category is far lower than prediction difficulty of content, complexity of model processing can be reduced. Then, a context vector corresponding to the first moment in the expression vector sequence is determined according to the feature information of the target foresight word, and the context vector is decoded by using a decoder, to obtain target content that corresponds to the context vector and that is expressed in the target language. In this way, word alignment accuracy of the decoder is improved, and probabilities of a repeated translation and a mistranslation are reduced, thereby improving translation accuracy.

Figure 10:
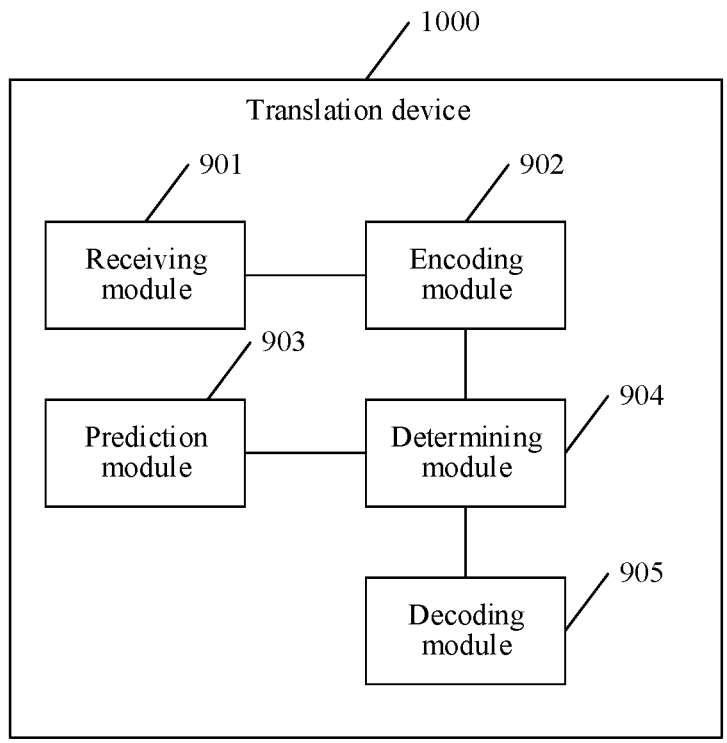
FIG. 10 is a schematic structural diagram of an embodiment of a translation device according to an embodiment of this application.

An embodiment of the present disclosure further provides a translation device. Referring to FIG. 10, the embodiments of the present disclosure provide an embodiment of a translation device 1000, including:

a receiving module 901, configured to receive to-be-processed information, the to-be-processed information being expressed in a source language;

an encoding module 902, configured to encode, by using an encoder, the to-be-processed information received by the receiving module 901, and generate an expression vector sequence of the to-be-processed information;

a prediction module 903, configured to predict feature information of a target foresight word at a first moment by using a prediction model, the target foresight word being expressed in a target language;

a determining module 904, configured to determine a context vector corresponding to the first moment in the expression vector sequence generated by the encoding module according to the feature information of the target foresight word that is predicted by the prediction module 903; and a decoding module 905, configured to decode, by using a decoder, the context vector determined by the determining module 904, to obtain target content that corresponds to the context vector and that is expressed in the target language.

Figure 11:
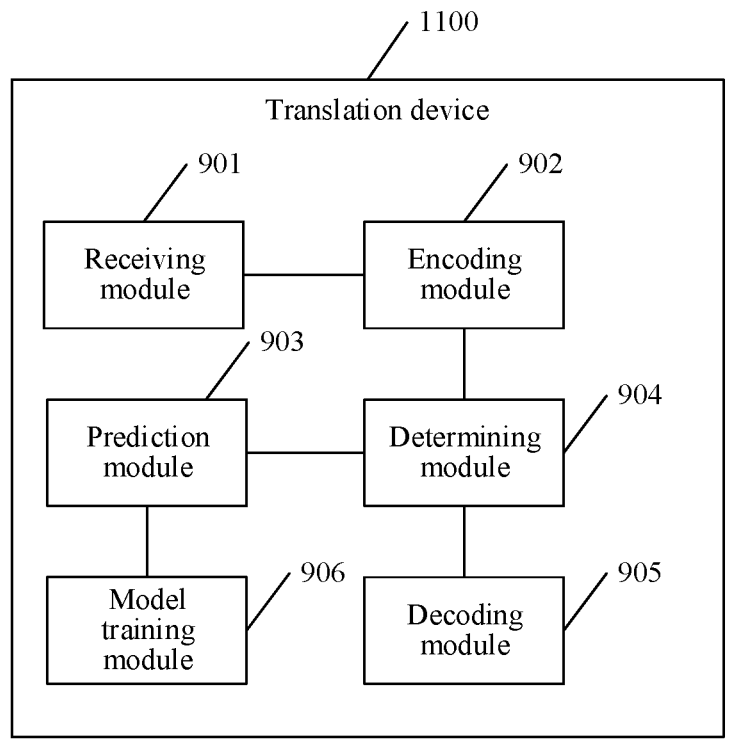
FIG. 11 is a schematic structural diagram of another embodiment of a translation device according to an embodiment of this application.

Based on the embodiment corresponding to FIG. 10, referring to FIG. 11, the embodiments of the present disclosure provide an embodiment of a translation device 1100, further including:

a model training module 906.

The model training module 906 is configured to train the prediction model according to information in a data set, the data set including source language sentences, target language sentences corresponding to the source language sentences, and feature information of the target language sentences.

Figure 12:
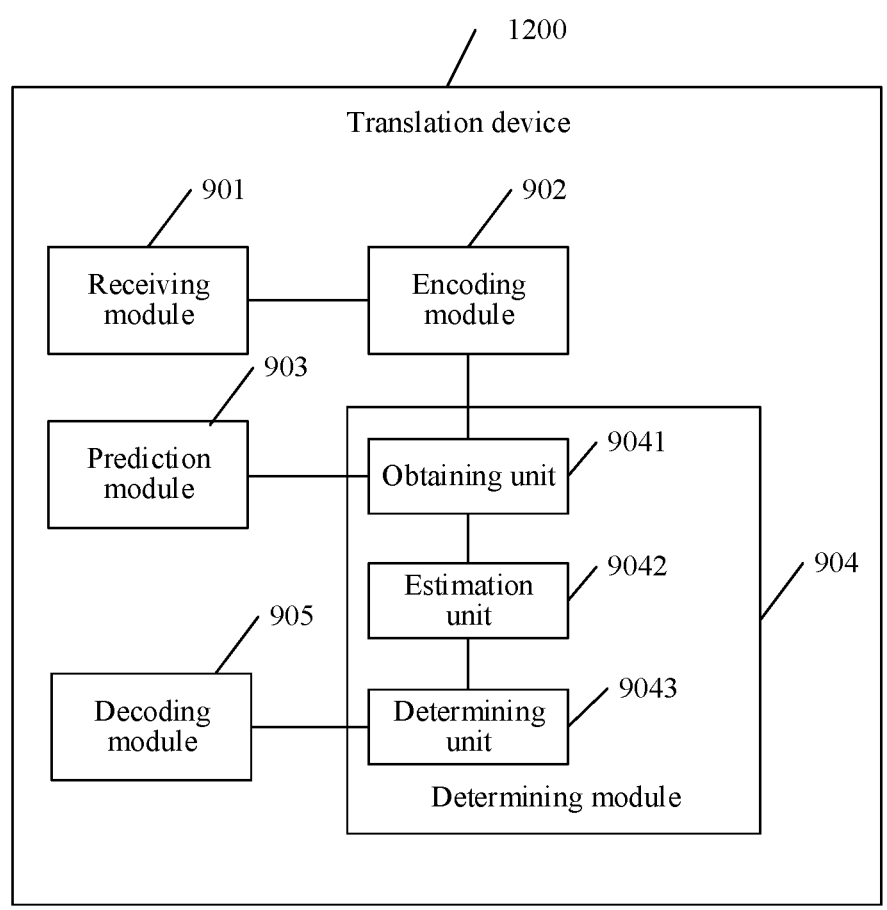
FIG. 12 is a schematic structural diagram of another embodiment of a translation device according to an embodiment of this application.

Based on the embodiment corresponding to FIG. 10, referring to FIG. 12, the embodiments of the present disclosure provide an embodiment of a translation device 1200, where the determining module 904 includes an obtaining unit 9041, an estimation unit 9042, and a determining unit 9043.

The obtaining unit 9041 is configured to obtain the feature information of the target foresight word predicted by the prediction module 903 in the expression vector sequence obtained by the encoding module 902 through encoding.

The estimation unit 9042 is configured to perform estimation on the feature information of the target foresight word obtained by the obtaining unit 9041, to obtain an estimation result.

The determining unit 9043 is configured to determine the context vector corresponding to the first moment in the expression vector sequence according to the estimation result obtained through estimation by the estimation unit 9042.

Figure 13:
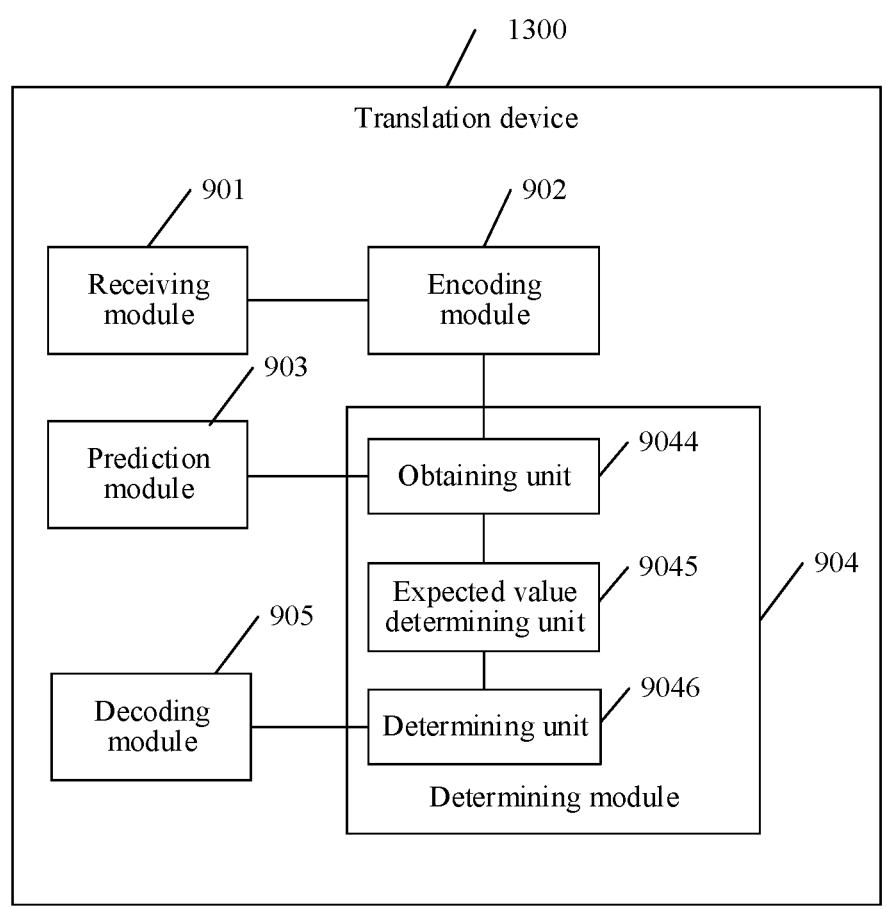
FIG. 13 is a schematic structural diagram of another embodiment of a translation device according to an embodiment of this application.

Based on the embodiment corresponding to FIG. 10, referring to FIG. 13, the embodiments of the present disclosure provide an embodiment of a translation device 1300, where the determining module 904 includes an obtaining unit 9044, an expected value determining unit 9045, and a determining unit 9046.

The obtaining unit 9044 is configured to obtain the feature information of the target foresight word.

The expected value determining unit 9045 is configured to determine an expected value of the feature information of the target foresight word.

The determining unit 9046 is configured to determine the context vector corresponding to the first moment in the expression vector sequence according to the expected value.

Optionally, the prediction module 903 is further configured to predict the feature information of the target foresight word at the first moment by using the prediction model according to a hidden state of the decoder at a second moment, the second moment being an adjacent moment before the first moment.

Optionally, the prediction module 903 is further configured to obtain a first result by using a neural network model according to target content corresponding to a second moment, the second moment being an adjacent moment before the first moment, and the first result being a hidden state of a hidden unit of the neural network model at the first moment.

The feature information of the target foresight word at the first moment is predicted by using the prediction model according to the first result.

Optionally, the prediction module 903 is further configured to obtain the first result by using the neural network model according to the target content corresponding to the second moment and a word vector at the first moment, the word vector being a vector expressed according to a phrase order in the expression vector sequence.

Further, the translation device in FIG. 10 to FIG. 13 is presented in the form of a functional module. The "module" herein may be an application-specific integrated circuit (ASIC), a circuit, a processor that executes one or more software or firmware programs and a memory, an integrated logical circuit, and/or another device that can provide the foregoing function. In a simple embodiment, the translation device in FIG. 10 to FIG. 13 may use a form shown in FIG. 14.

Figure 14:
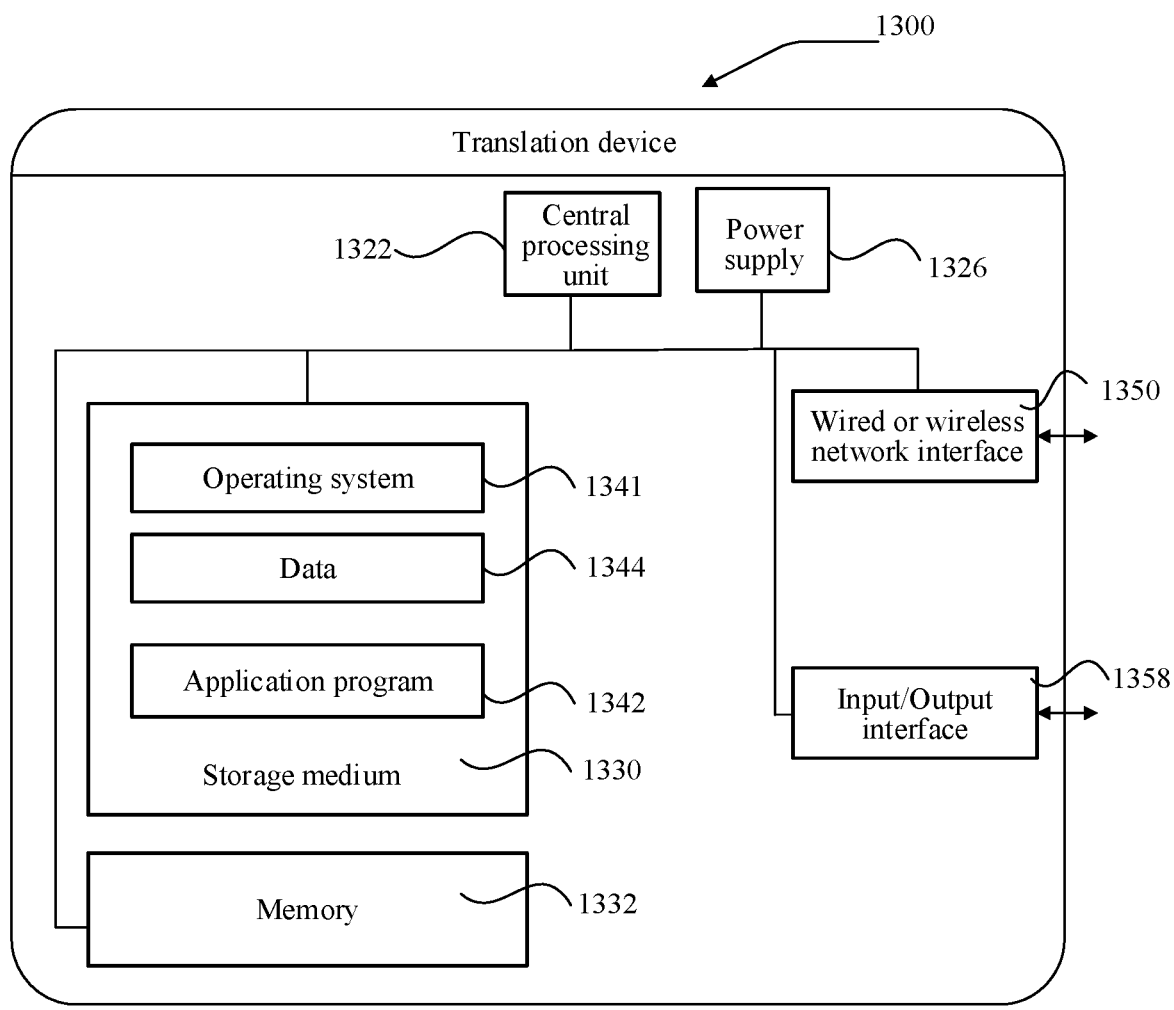
FIG. 14 is a schematic structural diagram of another embodiment of a translation device according to an embodiment of this application.

FIG. 14 is a schematic structural diagram of a translation device according to an embodiment of the present disclosure. The translation device 1300 may vary greatly due to different configurations or performance, and may include one or more central processing units (CPUs) 1322 (for example, one or more processors), a memory 1332, and one or more storage mediums 1330 (for example, one or more mass storage devices) that store an application program 1342 or data 1344. The memories 1332 and the storage mediums 1330 may be used for transient storage or permanent storage. The program stored in the storage mediums 1330 may include one or more modules (not shown in the figure), and each module may include a series of instruction operations in a translation device. Furthermore, the CPUs 1322 may be configured to communicate with the storage mediums 1330, and perform, on the translation device 1300, the series of instruction operations in the storage mediums 1330.

The translation device 1300 may further include one or more power supplies 1326, one or more wired or wireless network interfaces 1350, one or more input/output interfaces 1358, and/or one or more operating systems 1341.

Steps performed by the translation device in the foregoing embodiments may be based on the structure of the translation device shown in FIG. 14. Specifically, the CPUs 1322 are configured to cause the translation device to perform the method that is specifically performed by the translation device in the foregoing method embodiments.

An embodiment of the present disclosure further provides a computer storage medium, configured to store a computer software instruction used by a translation device, the computer software instruction including a program designed for performing the method specifically performed in the foregoing method embodiments.

An embodiment of the present disclosure further provides a computer program product including an instruction. When run on a computer, the instruction causes the computer to perform operations in the machine translation method according to any one of embodiments of the present disclosure.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in the form of a software product. The software product is stored in a storage medium and includes several instructions for causing a computer device (which may be a personal computer, a server, a network device, or the like) to perform all or some of the steps of the methods described in the embodiments of the present disclosure. The foregoing storage medium includes various medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art needs to understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A machine translation method, applied to a translation device, and comprising:
   encoding an inputted sentence to obtain an expression vector sequence of the inputted sentence;
   predicting feature information of a target foresight word of the inputted sentence, the feature information including a word category of the target foresight word, and the word category indicating the target foresight word is a noun or a verb or an adjective or an adverb, wherein the feature information is predicted at a first moment by:
      obtaining a first result by using a neural network model at a second moment, the second moment being an adjacent moment before the first moment, and the first result being a hidden state of a hidden unit of the neural network model at the first moment; and
      predicting, by using the prediction model according to the first result, the feature information of the target foresight word at the first moment;
   determining a context vector according to the feature information of the target foresight word; and
   decoding the context vector to obtain target content that corresponds to the context vector.

2. The method according to claim 1, wherein the feature information is predicted by using a prediction model, the method further comprises:
   training the prediction model according to a data set.

3. The method according to claim 1, wherein the context vector is determined by:
   performing estimation on the feature information of the target foresight word, to obtain an estimation result; and
   determining the context vector according to the estimation result.

4. The method according to claim 1, wherein the context vector is determined by:
   determining an expected value of the feature information of the target foresight word; and
   determining the context vector according to the expected value.

5. The method according to claim 1, wherein the context vector is decoded by using a decoder.

6. The method according to claim 1, wherein the first result is obtained by:
   obtaining the first result by using the neural network model at the second moment and a word vector at the first moment, the word vector being a vector expressed according to a phrase order in the expression vector sequence.

7. A translation device, comprising: a memory, configured to store computer-executable program code; a network interface; and a processor, coupled to the memory and the network interface, and configured to:
   encode an inputted sentence to obtain and generate an expression vector sequence of the inputted sentence;
   predict feature information of a target foresight word of the inputted sentence, the feature information including a word category of the target foresight word, and the word category indicating the target foresight word is a noun or a verb or an adjective or an adverb, wherein the feature information is predicted at a first moment by:
      obtaining a first result by using a neural network model at a second moment, the second moment being an adjacent moment before the first moment, and the first result being a hidden state of a hidden unit of the neural network model at the first moment; and
      predicting, by using the prediction model according to the first result, the feature information of the target foresight word at the first moment;
   determine a context vector according to the feature information of the target foresight word; and
   decode the context vector, to obtain target content that corresponds to the context vector.

8. The device according to claim 7, wherein the feature information is predicted by using a prediction model, the processor is further configured to:
   train the prediction model according to a data set.

9. The device according to claim 7, wherein the processor is further configured to:
   perform estimation on the feature information of the target foresight word, to obtain an estimation result; and
   determine the context vector according to the estimation result.

10. The device according to claim 7, wherein the processor is further configured to:
    determine an expected value of the feature information of the target foresight word; and
    determine the context vector according to the expected value.

11. The device according to claim 7, wherein the context vector is decoded by using a decoder.

12. The device according to claim 7, wherein the processor is further configured to:
obtain the first result by using the neural network model at the second moment and a word vector at the first moment, the word vector being a vector expressed according to a phrase order in the expression vector sequence.

13. A non-transitory computer-readable storage medium, storing a computer software instruction, the computer software instruction, when being executed, causing the translation device to perform:
encoding an inputted sentence to obtain an expression vector sequence of the inputted sentence;
predicting feature information of a target foresight word of the inputted sentence, the feature information including a word category of the target foresight word, and the word category indicating the target foresight word is a noun or a verb or an adjective or an adverb, wherein the feature information is predicted at a first moment by:
obtaining a first result by using a neural network model at a second moment, the second moment being an adjacent moment before the first moment, and the first result being a hidden state of a hidden unit of the neural network model at the first moment; and
predicting, by using the prediction model according to the first result, the feature information of the target foresight word at the first moment;
determining a context vector according to the feature information of the target foresight word; and
decoding the context vector to obtain target content that corresponds to the context vector.

14. The storage medium according to claim 13, wherein the feature information is predicted by using a prediction model, and the computer software instruction further causes the translation device to perform:
training the prediction model according to a data set.

15. The storage medium according to claim 13, wherein the context vector is determined by:
determining an expected value of the feature information of the target foresight word; and determining the context vector according to the expected value.

16. The storage medium according to claim 13, wherein the first result is obtained by:
obtaining the first result by using the neural network model at the second moment and a word vector at the first moment, the word vector being a vector expressed according to a phrase order in the expression vector sequence.

17. The storage medium according to claim 13, the context vector is decoded by using a decoder.

* * * * *